(12) United States Patent
Kim et al.

(10) Patent No.: US 12,549,023 B2
(45) Date of Patent: Feb. 10, 2026

(54) ELECTRONIC DEVICE COMPRISING A PLURALITY OF BATTERIES AND METHOD FOR PROTECTING THE BATTERIES IN THE SAME

(71) Applicant: SAMSUNG ELECTRONICS CO., LTD., Suwon-si (KR)

(72) Inventors: Gusup Kim, Suwon-si (KR); Duhyun Kim, Suwon-si (KR); Jiyong Park, Suwon-si (KR); Seongil Lee, Suwon-si (KR); Wonjea Jang, Suwon-si (KR); Yongsub Jeon, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 596 days.

(21) Appl. No.: 18/156,400

(22) Filed: Jan. 19, 2023

(65) Prior Publication Data

US 2023/0179003 A1 Jun. 8, 2023

Related U.S. Application Data

(63) Continuation of application No. PCT/KR2022/019971, filed on Dec. 8, 2022.

(30) Foreign Application Priority Data

Dec. 8, 2021 (KR) .......................... 10-2021-0175119
Feb. 10, 2022 (KR) .......................... 10-2022-0017670

(51) Int. Cl.
*H02J 7/00* (2006.01)
*H01M 10/42* (2006.01)
(Continued)

(52) U.S. Cl.
CPC ....... *H02J 7/00302* (2020.01); *H01M 10/425* (2013.01); *H01M 10/441* (2013.01);
(Continued)

(58) Field of Classification Search
CPC .. H02J 7/00302; H02J 7/0013; H02J 7/00306; H02J 7/0047; H02J 7/00304;
(Continued)

(56) References Cited

U.S. PATENT DOCUMENTS 5,652,496 A * 7/1997 Pilarzyk ................ H02J 7/0029
429/7
6,172,482 B1 * 1/2001 Eguchi ..................... H02H 7/18
320/136

(Continued)

FOREIGN PATENT DOCUMENTS

EP  4210193 A1 * 7/2023 ............ H02J 7/0071
JP  5714975 B2    5/2015
(Continued)

OTHER PUBLICATIONS

International Search Report mailed Mar. 17, 2023 for PCT/KR2022/019971.

*Primary Examiner* — M Baye Diao
(74) *Attorney, Agent, or Firm* — CANTOR COLBURN LLP

(57) ABSTRACT

A method for protecting a battery of an electronic device including a plurality of batteries, includes: measuring a total current ($I_{total}$) value output from a charging module while the plurality of batteries are charged via the charging module; detecting a first current ($I_1$) value output to a first battery via a current limiter; calculating a difference between the total current ($I_{total}$) value and the first current ($I_1$) value to estimate a second current ($I_2$) value transferred to a second battery without passing through any current limiter, where the first battery and the second battery are included in the plurality of batteries; and controlling, based on the estimated second current ($I_2$) value, a current of the second battery, which has the second current ($I_2$) value, by controlling (Continued)

opening/closing of a switching module included in a protection circuit module of the second battery.

20 Claims, 10 Drawing Sheets

(51) Int. Cl.
    *H01M 10/44*         (2006.01)
    *H01M 10/46*         (2006.01)
    *H01M 10/48*         (2006.01)
    *H01M 50/512*       (2021.01)
    *H04M 1/02*          (2006.01)

(52) U.S. Cl.
    CPC ........... *H01M 10/46* (2013.01); *H01M 10/48* (2013.01); *H01M 50/512* (2021.01); *H02J 7/0013* (2013.01); *H02J 7/00306* (2020.01); *H02J 7/0047* (2013.01); *H01M 2010/4271* (2013.01); *H01M 2220/30* (2013.01); *H04M 1/0216* (2013.01)

(58) Field of Classification Search
    CPC .. H01M 10/425; H01M 10/441; H01M 10/46; H01M 10/48; H01M 50/512; H01M 2010/4271; H01M 2220/30; H04M 1/0216; H04M 1/0262; H04M 1/72454
    USPC ......................................................... 320/126
    See application file for complete search history.

(56) References Cited

U.S. PATENT DOCUMENTS

| | | | |
|---|---|---|---|
| 6,804,100 B2 * | 10/2004 | Astala ................. | H02J 7/00308 361/18 |
| 7,495,416 B2 * | 2/2009 | Sato ....................... | H02J 7/342 320/136 |
| 8,860,372 B2 | 10/2014 | Guang et al. | |
| 9,812,878 B1 * | 11/2017 | Stieber .................... | H02J 7/007 |
| 10,778,006 B2 | 9/2020 | Parmar et al. | |
| 10,807,547 B2 | 10/2020 | Obayashi et al. | |
| 11,133,535 B2 | 9/2021 | Kim et al. | |
| 11,165,261 B2 | 11/2021 | Motoichi et al. | |
| 11,283,270 B2 | 3/2022 | Kim et al. | |
| 11,296,518 B2 * | 4/2022 | Park ....................... | H02J 7/0024 |
| 11,658,507 B2 * | 5/2023 | Yoon .................... | H02J 7/00036 320/137 |
| 2006/0043945 A1 | 3/2006 | Sohn et al. | |
| 2006/0164042 A1 | 7/2006 | Sim | |
| 2006/0181244 A1 * | 8/2006 | Luo ....................... | H02J 7/0036 320/128 |
| 2007/0090798 A1 | 4/2007 | Yun et al. | |
| 2012/0286722 A1 | 11/2012 | Kabasawa et al. | |
| 2014/0042972 A1 | 2/2014 | Kim et al. | |
| 2014/0070774 A1 | 3/2014 | Terlizzi et al. | |
| 2017/0072812 A1 | 3/2017 | Von Novak et al. | |
| 2018/0152030 A1 | 5/2018 | Shin et al. | |
| 2021/0021144 A1 * | 1/2021 | Geng .................. | H01M 10/441 |
| 2022/0278543 A1 * | 9/2022 | Kacperski ............. | H02J 7/0045 |

FOREIGN PATENT DOCUMENTS

| | | |
|---|---|---|
| KR | 10-2006-0019164 A | 3/2006 |
| KR | 10-2006-0086024 A | 7/2006 |
| KR | 10-2007-0043149 A | 4/2007 |
| KR | 10-1017327 B1 | 2/2011 |
| KR | 10-1208570 B1 | 12/2012 |
| KR | 10-2013-0126085 A | 11/2013 |
| KR | 10-2014-0021904 A | 2/2014 |
| KR | 1020190001830 A | 1/2019 |
| KR | 10-2046005 B1 | 11/2019 |
| KR | 1020200012105 A | 2/2020 |

* cited by examiner

[4001]

[4002]

ELECTRONIC DEVICE COMPRISING A PLURALITY OF BATTERIES AND METHOD FOR PROTECTING THE BATTERIES IN THE SAME

TECHNICAL FIELD

Various embodiments relate to an electronic device including multiple batteries and a method for protecting the batteries thereof.

BACKGROUND ART

New types of electronic devices such as foldable (or rollable) electronic devices have been proposed, and electronic devices are thus equipped with multiple batteries (for example, battery packs or battery cells) to increase the battery power capacity. For example, a foldable electronic device may have two housings divided around a folding axis, and each housing may be equipped with a first battery (for example, main battery) and a second battery (for example, sub-battery).

DISCLOSURE

Technical Problem

In the case of foldable electronic devices, main components of the electronic devices, particularly, the charging circuit is disposed in the first housing, and may be physically separated from the battery (for example, sub-battery) disposed in the second housing. Accordingly, the charging circuit disposed in the first housing and the sub-battery disposed in the second housing may be connected through a wire (for example, flexible printed circuit board (FPCB)) in the case of foldable electronic devices.

It is desirable to provide overcharging/over-discharging protection functions and overcurrent blocking functions in batteries in terms of performance maintenance and stability, and the batteries may include a battery protecting circuit and a current limiter to this end.

However, it is desirable for the foldable electronic devices to have battery protecting circuits and current limiters configured individually for multiple batteries, thereby causing the problem of additional cost increase. In addition, an impedance difference occurs due to the resistance on the wire between the charging circuit disposed in the first housing and the sub-battery disposed in the second housing, together with problems related to battery heating imbalance and voltage drop.

Technical Solution

Various embodiments may propose a method and an apparatus for protecting a sub-battery connected in parallel to a main battery in an electronic device without additionally configuring a current limiter for the sub-battery other than the main battery.

According to an embodiment, an electronic device includes a first battery including a first protection circuit module (a first PCM), a second battery which is branched from a first node to be connected to the first battery in parallel and includes a second protection circuit module (a second PCM), a charging module which is connected to the first node and uses power input from an external device to charge the first battery and the second battery, a current limiter which is disposed between the first node and the first battery and adjusts a magnitude of a first current flowing into the first battery, and a processor electrically connected to the current limiter and the second battery, where the processor is configured to measure a value of a total current ($I_{total}$) output from the charging module and a value of a first current ($I_1$) output from the current limiter to the first battery, calculate a difference between the value of the total current ($I_{total}$) and the value of the first current ($I_1$) to estimate a value of a second current ($I_2$) transferred to the second battery, and control, based on the value of the second current ($I_2$), opening/closing of a switching module included in the second PCM to control the second current ($I_2$) of the second battery.

According to an embodiment, a method for protecting a battery of an electronic device including a plurality of batteries, includes: measuring a total current ($I_{total}$) value output from a charging module while a plurality of batteries are charged via the charging module, detecting a first current ($I_1$) value output to a first battery via a current limiter, calculating a difference between the total current ($I_{total}$) value and the first current ($I_1$) value to estimate a second current ($I_2$) value transferred to a second battery without passing through any current limiter, where the first battery and the second battery are included in the plurality of batteries, and controlling, based on the estimated second current ($I_2$) value, a current ($I_2$) of the second battery, which has the second current ($I_2$) value, by controlling opening/closing of a switching module included in a protection circuit module (PCM) of the second battery

Advantageous Effects

According to various embodiments, in the case of an electronic device including multiple batteries, no current limiter is implemented for a second battery (for example, sub-battery) other than a first battery (for example, main battery), and a switching element of a battery protecting circuit included in the second battery is used to limit the current of the second battery such that the reduced number of components can save costs and improve heating performance.

MODE FOR INVENTION

Figure 1:
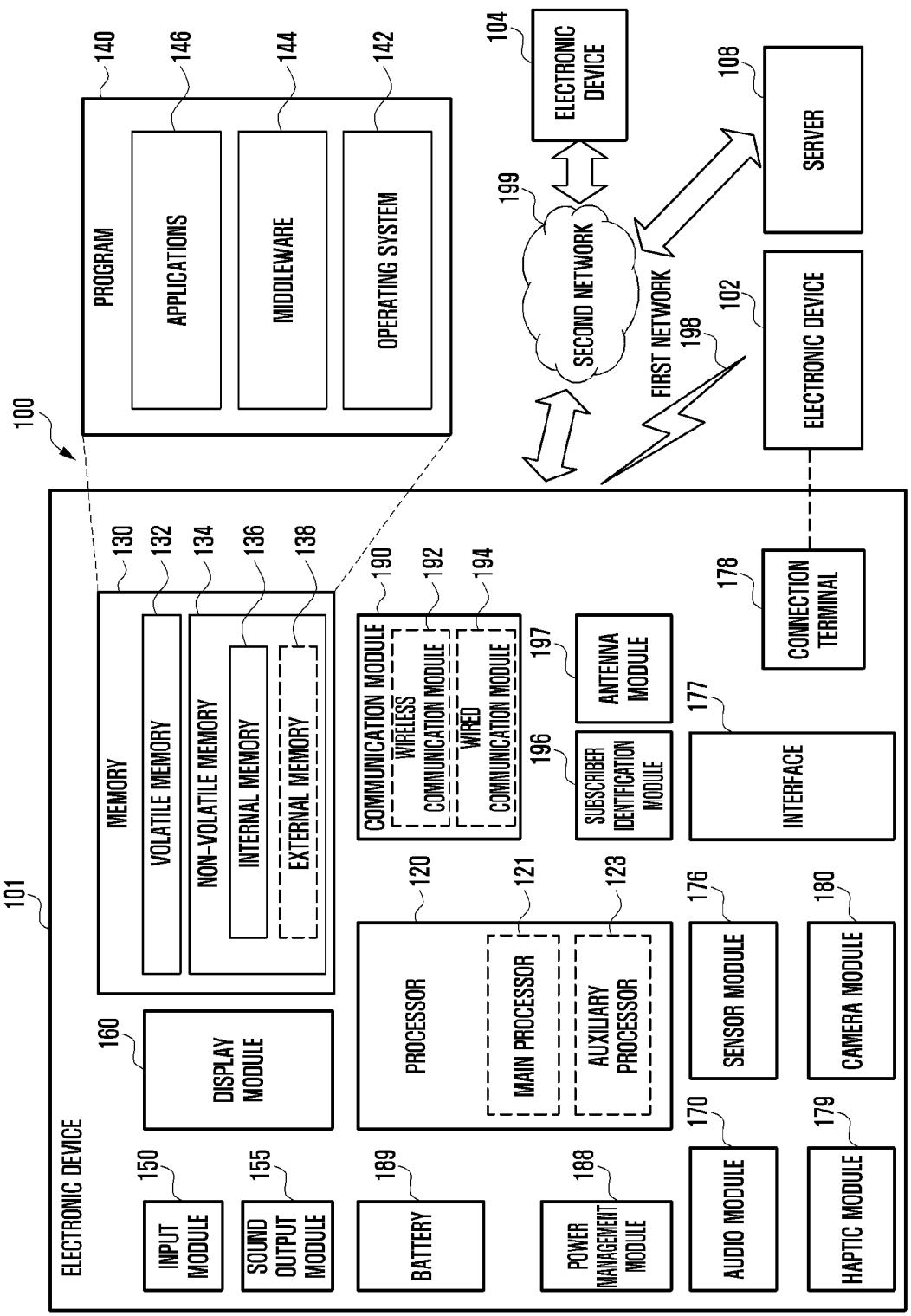
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
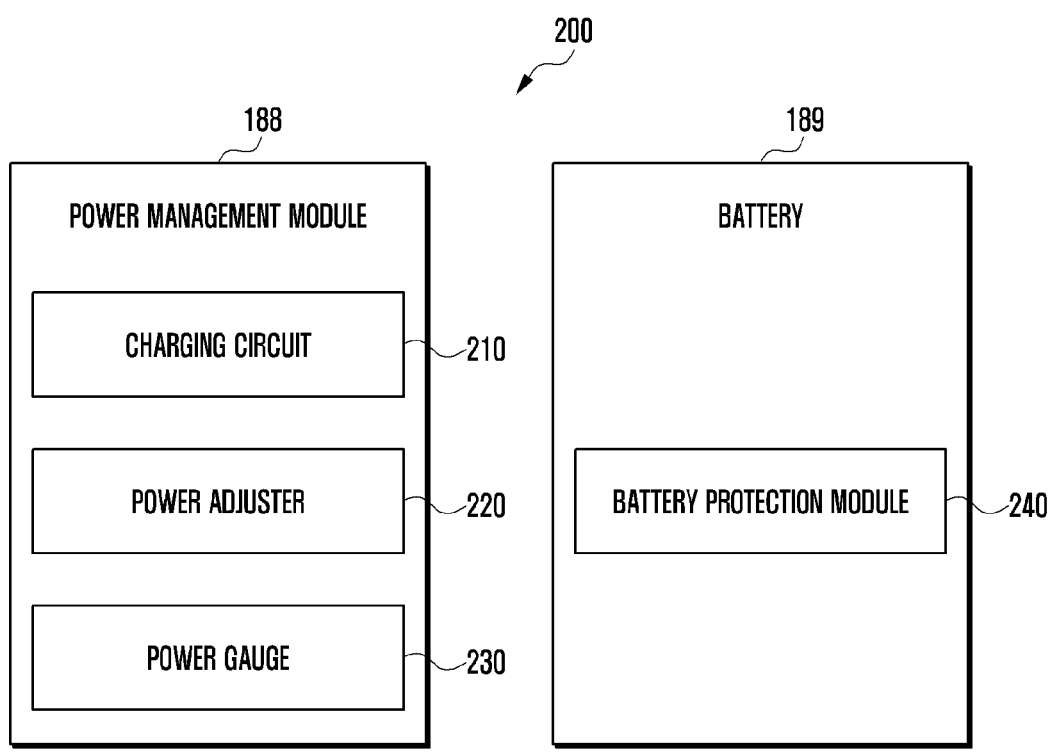
FIG. 2 is a block diagram illustrating the power management module and the battery according to various embodiments

FIG. 2 is a block diagram 200 illustrating the power management module 188 and the battery 189 according to various embodiments.

Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Hereinafter, the structure applicable to an electronic device 101 according to various embodiments will be described.

Figure 3:
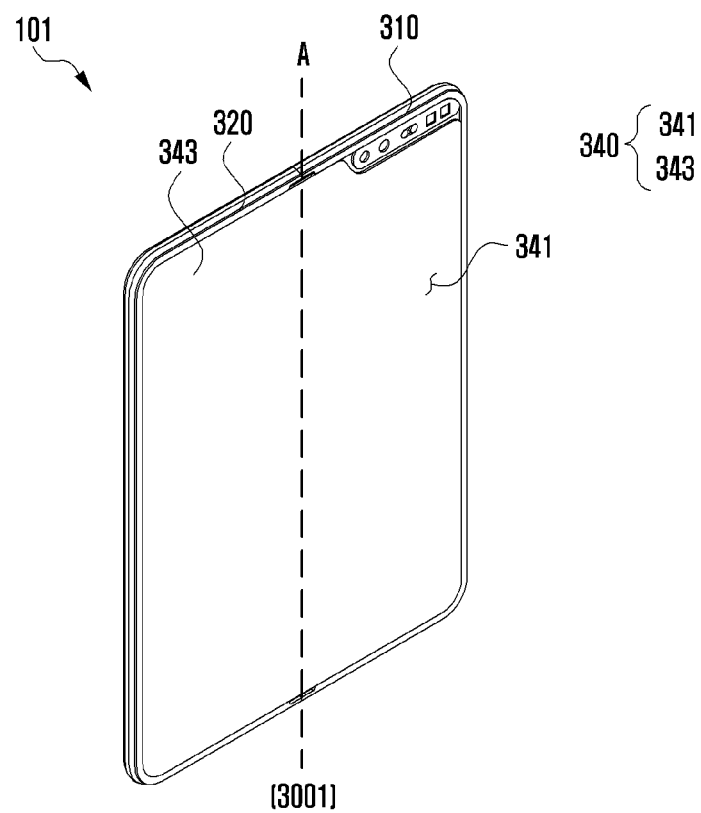
FIG. 3 illustrates an electronic device including a housing which is folded such that a first direction A is a folding axis according to an embodiment.
Figure 3:
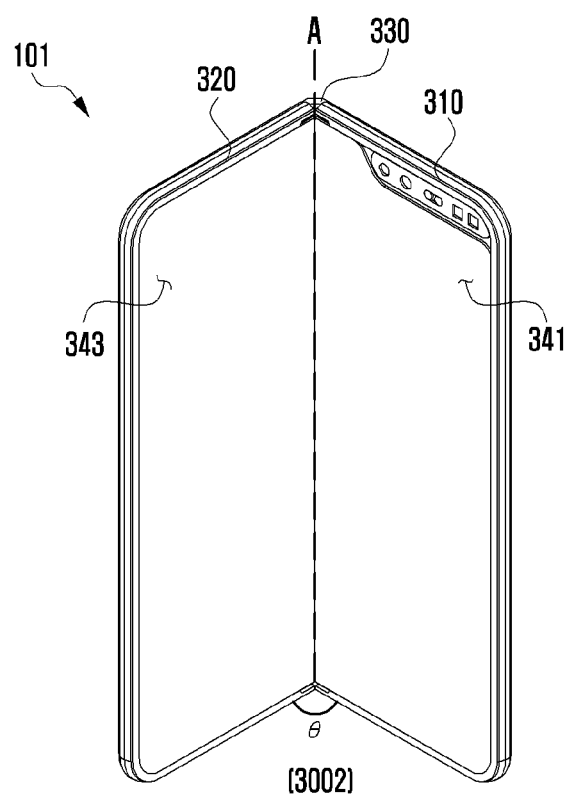

FIG. 3 illustrates an electronic device including a housing which is folded such that a first direction A is a folding axis according to an embodiment.

Referring to FIG. 3, the electronic device 101 (e.g., the electronic device 101 in FIG. 1) according to an embodiment may include a first housing 310, a second housing 320, a rotation assembly (or a hinge module) 330 configured to connect the first housing 310 and the second housing 320 such that the first housing 310 and the second housing 320 are rotatable with respect to each other, and a display 340 (e.g., the display module 160 in FIG. 1).

The first housing 310 and the second housing 320 may be configured such that the first direction A is a folding axis, be arranged on opposite sides with reference to the folding axis (e.g., A), and have substantially symmetrical shapes with reference to the folding axis (e.g., A).

The display 340 may be disposed from the first housing 310 to the second housing 320 across the rotation assembly 330. The display 340 may include a flexible or foldable display.

The display 340 may be divided into a first display area 341 disposed on the front surface of the first housing 310 and a second display area 343 disposed on the front surface of the second housing 320 with reference to the folding axis (e.g., A). Here, in the electronic device 101, a surface on which the display 340 is disposed may be defined as a front surface (or a first surface) of the electronic device, and the opposite surface of the front surface may be defined as a rear surface (a second surface or a back surface) of the electronic device 101. In addition, a surface surrounding a space between the front surface and the rear surface may be defined as a side surface of the electronic device. The term "state" may refer to the structural form, shape, or configuration of the electronic device (or the display).

The rotation assembly 330 (or the hinge module) may be implemented in an in-folding manner in which two display areas 341 and 343 face each other with respect to the front surface when the electronic device 101 is switched (or changed) from an unfolded, flat, or open state to a folded or closed state. For example, as illustrated in <3001>, when the electronic device 101 is in the unfolded state, the two display areas 341 and 343 may face in the same direction, and when switched (or changed) from the unfolded state to the folded state, as illustrated in <3002>, the two display areas 341 and 343 may rotate in directions facing each other with respect to the front surface.

Although not illustrated in the drawings, the electronic device 101 to which various embodiments are applied may be implemented as an electronic device which is folded in an out-folding manner. In the out-folding electronic device, when the electronic device 101 is state-switched from the unfolded state to the folded state, the rotation assembly 330 may be implemented in an out-folding manner in which the two display areas 341 and 343 face in opposite directions from each other with respect to the rear surface.

According to an embodiment, the first housing 310 and the second housing 320 may form different angles or distances with each other depending on whether the electronic device 101 is in the unfolded state (a flat state or an unfolding state), the folded state (folding state), or an intermediate state which is between the unfolded state and the folded state. For example, the intermediate state may mean a free-stop state in which the first housing 310 and the second housing 320 have a specific angle (e.g., an angle θ) between 0 and 180 degrees.

According to an embodiment, a plurality of batteries may be arranged in the first housing 310 or the second housing 320 of the electronic device 101. For example, at least one battery (e.g., a main battery and a first battery) and elements (e.g., a processor 120, a camera module 180, a sensor module 176, and a power management module 188) of the electronic device 101 may be arranged in an inner space of the first housing 310.

At least one battery (e.g., a sub-battery and a second battery) and elements (e.g., at least one of the components in FIG. 1) of the electronic device 101 may be arranged in an inner space of the second housing 320. Each battery may be arranged in a battery pack, or may be arranged in one battery pack as a plurality of battery cells.

Although not illustrated, the electronic device 101 may include a wire (e.g., a data wire or a power supply wire) arranged in the inner space of the first housing 310 and the second housing 320 across the rotation assembly 330. A part of the wire (e.g., the data wire or the power wire) may be placed, for example, on a flexible printed circuit board (FPCB) which crosses the rotation assembly 330.

For example, data communication between the elements dispersed in the housings 310 and 320 may be possible via the data wire. It may be possible to charge multiple batteries and supply power to the elements via the power wire.

Figure 4:
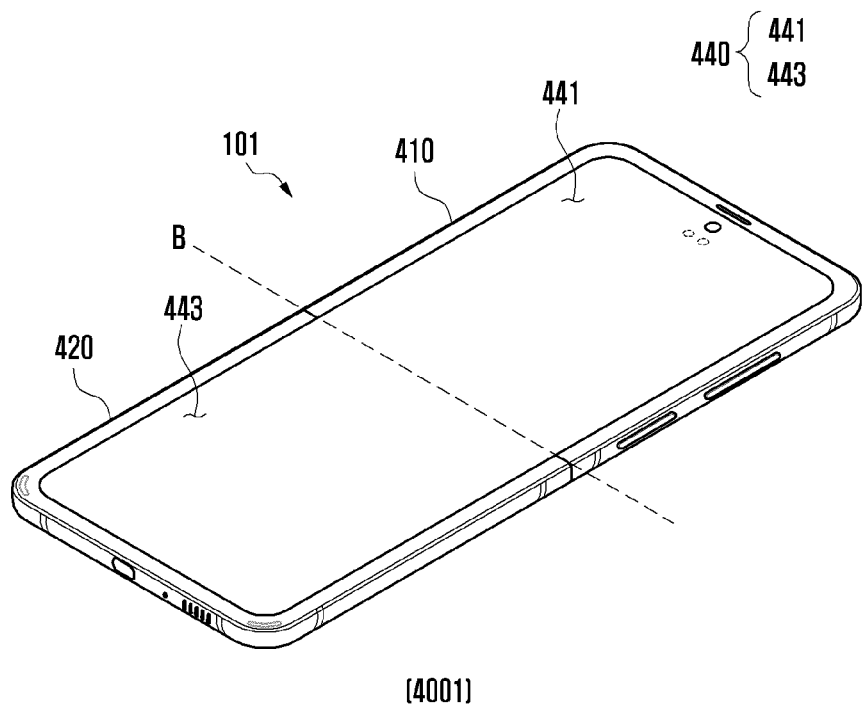
FIG. 4 illustrates an electronic device including a housing which is folded such that a second direction B is a folding axis according to an embodiment.
Figure 4:
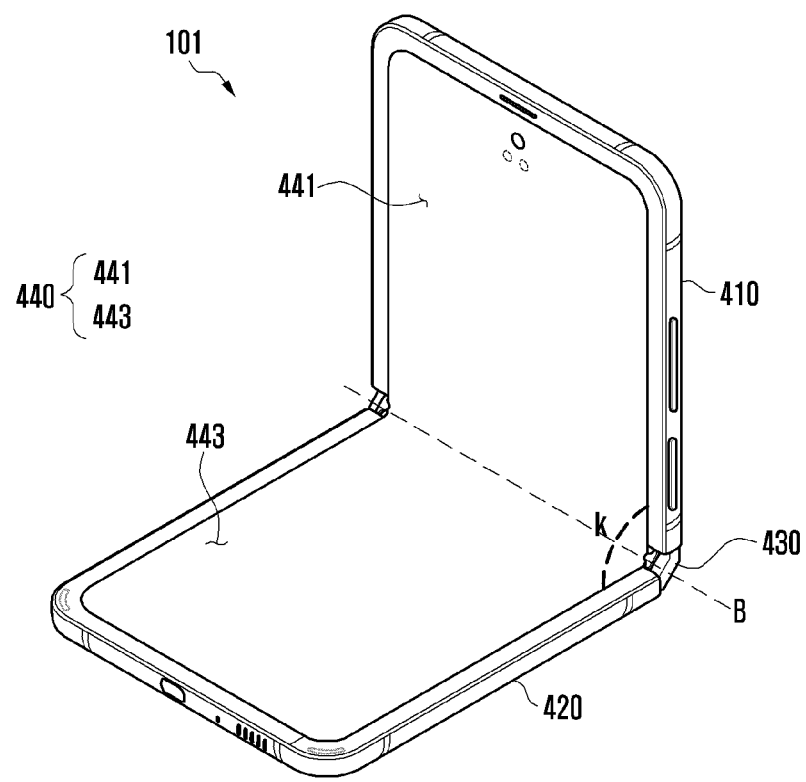

FIG. 4 illustrates an electronic device including a housing which is folded such that a second direction B is a folding axis according to an embodiment.

Referring to FIG. 4, the electronic device 101 (e.g., the electronic device in FIG. 1) according to an embodiment may include a first housing 410, a second housing 420, a rotation assembly (or a hinge module) 430, and a display 440. In the electronic device 101 in FIG. 4, the first housing 410 and the second housing 420 may be configured such that the second direction B is a folding axis, be arranged on upper and lower sides with reference to the folding axis (e.g., B), and have substantially symmetrical shapes with reference to the folding axis (e.g., B).

The display 440 may be disposed from the first housing 410 to the second housing 420 across the rotation assembly 430. The display 440 may include a flexible or foldable display. The display 440 may be divided into a first display area 441 disposed on the front surface of the first housing 410 and a second display area 443 disposed on the front surface of the second housing 420 with reference to the folding axis (e.g., B).

The rotation assembly 430 (or the hinge module) may be implemented in an in-folding manner in which two display areas 441 and 443 face each other with respect to the front surface when the electronic device 101 is switched (or changed) from an unfolded, flat, or open state to a folded or closed state. For example, as illustrated in <4001>, when the electronic device 101 is in the unfolded state, the two display areas 441 and 443 may face in the same direction, and when switched (or changed) from the unfolded state to the folded state, as illustrated in <4002>, the two display areas 441 and 443 may rotate in directions facing each other with respect to the front surface.

The first housing 410 and the second housing 420 may form different angles or distances with each other depending on whether the electronic device 101 is in the unfolded state (a flat stage or an unfolding state), the folded state (folding state), or an intermediate state which is between the unfolded state and the folded state. For example, the intermediate state may mean a free-stop state in which the first housing 410 and the second housing 420 have a specific angle (e.g., an angle k) between 0 and 180 degrees. Since the electronic device 101 illustrated in FIG. 4 has the same components as in FIG. 3 except that the display 430 is implemented with a folding axis in the second direction B instead of a folding axis in the first direction A, the components, functions, and/or structures overlapping with those illustrated in FIG. 3 will may be omitted.

Figure 5:
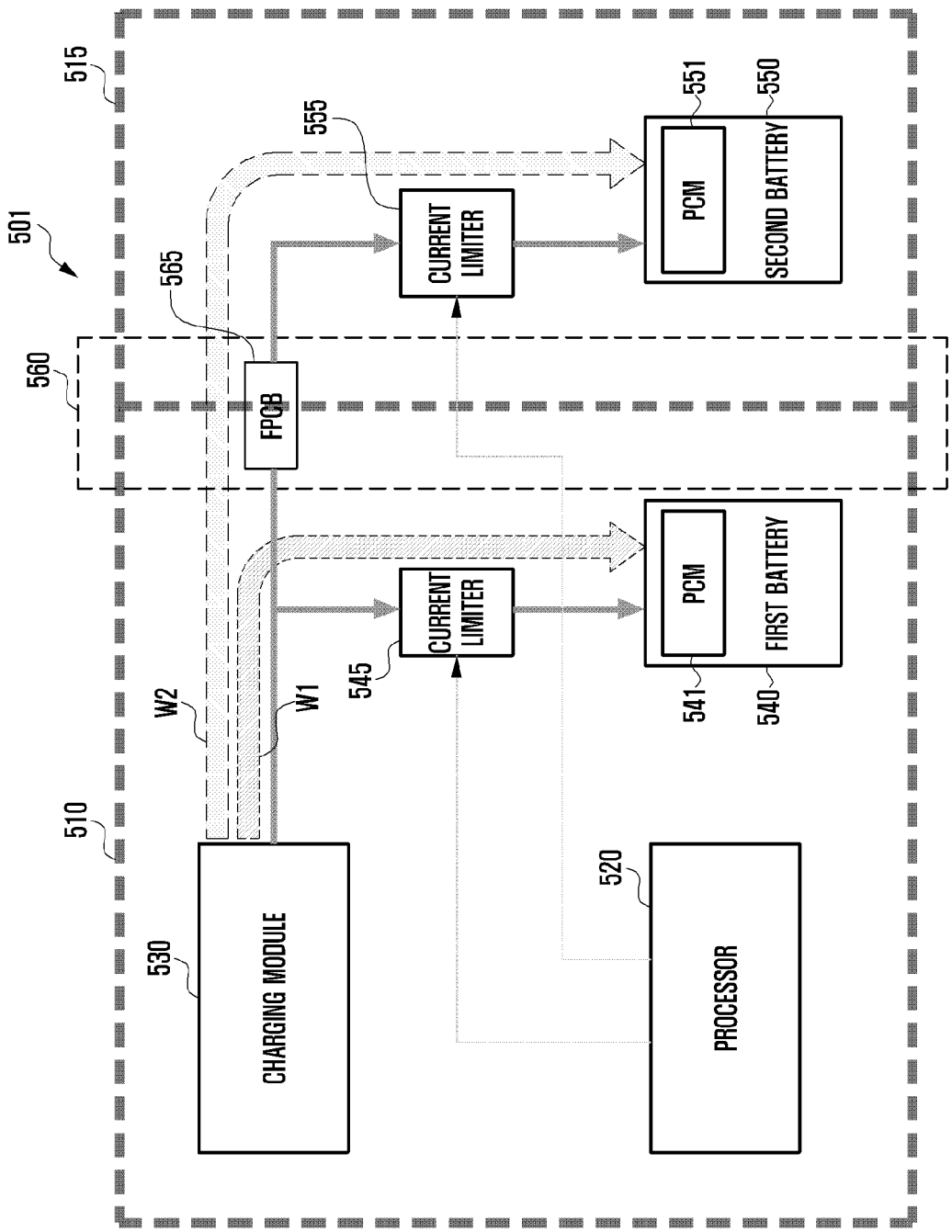
FIG. 5 illustrates a structure for an overcurrent protection function of a foldable electronic device according to a comparative example.

FIG. 5 illustrates a structure for an overcurrent protection function of a foldable electronic device according to a comparative example.

Referring to FIG. 5, in a foldable electronic device 501 according to a comparative example (or a conventional art), for example, as illustrated in FIG. 3 and FIG. 4, a first housing 510 and a second housing 515 may be rotatably coupled to each other via a rotation assembly 560 (a hinge module or a folding structure).

When the foldable electronic device 501 includes a plurality of batteries 540 and 550, the batteries 540 and 550 may be arranged in the housings 510 and 515 so as to be physically separated. For example, a processor 520, a charging module (charger IC) 530 (e.g., the charging circuit 210 in FIG. 2), and a first battery (e.g., the main battery) 540 may be disposed in the first housing 510, and the second battery (e.g., the sub-battery) 550 may be disposed in the second housing 515.

In general, the batteries 540 and 550 may be rechargeable and dischargeable secondary batteries. The batteries 540 and 550 may include protection circuit modules (PCM) 541 and 551 and current limiters 545 and 555 so as to perform a battery protection function (e.g., at least one of an overcharge protection function, an over-discharge protection function, an overcurrent blocking function, or a short-circuiting protection function) for each battery.

The current limiters 545 and 555 may be operationally or electrically connected to the processor 520. The current limiters 545 and 555 may detect the current flowing in a charging path or a discharging path and transmit the same to the processor 520. The current limiters 545 and 555 may adjust or block, based on the signal received from the processor 520 to limit the current, the magnitude of the charge current or the discharge current.

When charging/discharging, a difference between the maximum (max) and minimum (min) of a limit current is close (e.g., 1 ampere (A)) and precise control is difficult only with the overcurrent protection function applied to PCM. Therefore, current limiters 545 and 555 are prevalently used as battery protection means.

For example, as illustrated in FIG. 5, in the foldable electronic device 501, a first current limiter 545 may be disposed between the first battery 540 and an output terminal of the charging module 530, and a second current limiter 555 may be disposed between the second battery 550 and an output terminal of the charging module 530. Accordingly, the cost for additionally implementing a current limiter for each battery may be increased.

In addition, the second battery 550 may be electrically connected to the charging module 530 disposed in the first housing 510 via a wire 565 (e.g., FPCB) positioned in the folding structure 560. In this case, a first electrical path W1 between the first battery 540 and the charging module 530 and a second electrical path W2 between the second battery 550 and the charging module 530 may have different impedances due to the length of the path and/or the resistance component included in the FPCB 565. Such impedance deviations may cause deviation or asymmetry of the current supplied to the first battery 540 or the second battery 550, and may cause the problem of not being able to accurately protect the batteries 540 and 550.

Hereinafter, the electronic device according to various embodiments will be described in how the processor can perform the overcurrent blocking function of the batteries using the battery protection circuit modules without the intervention of the current limiters.

Figure 6A:
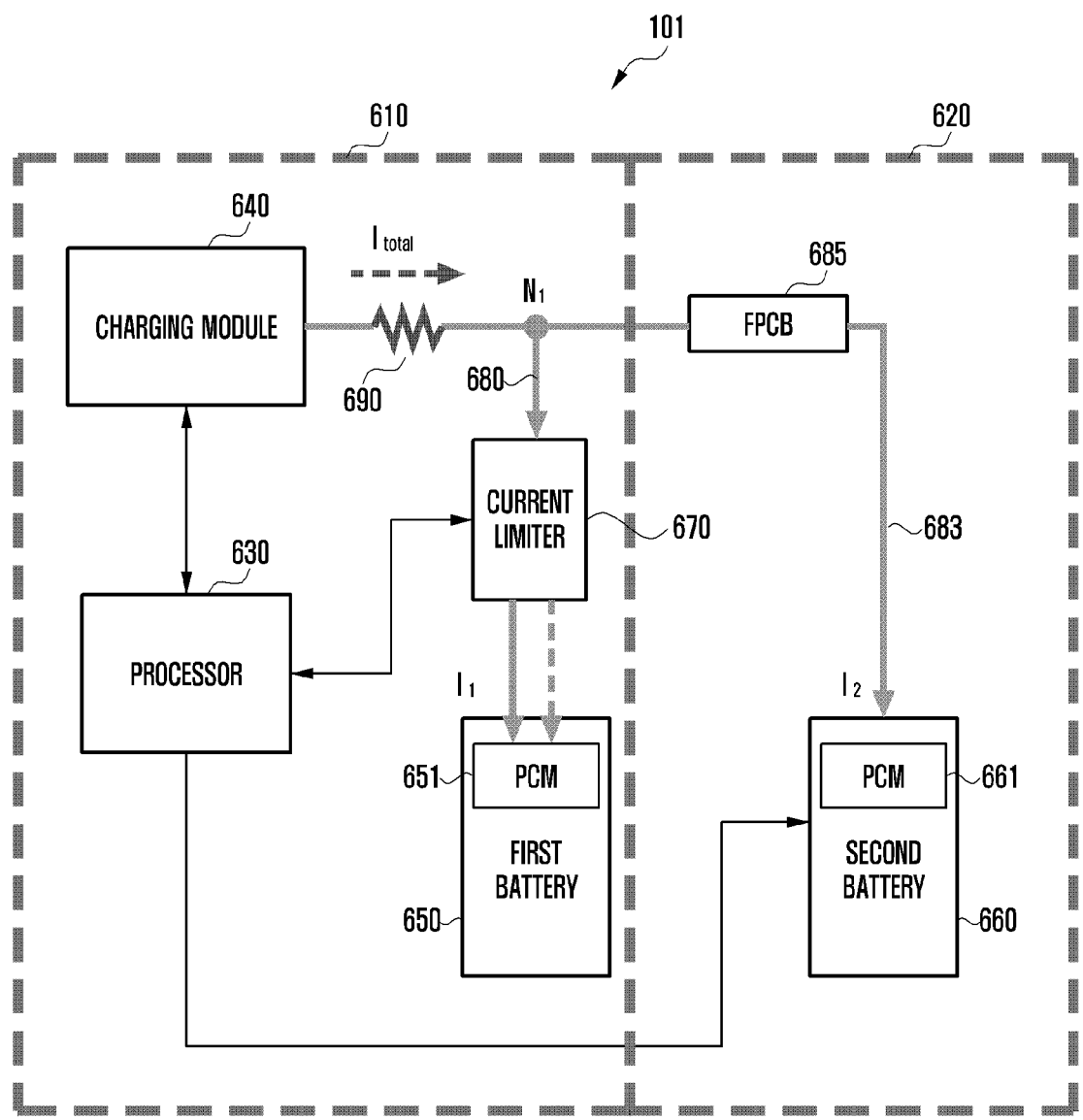
FIG. 6A illustrates a configuration of an electronic device according to various embodiments.
Figure 6B:
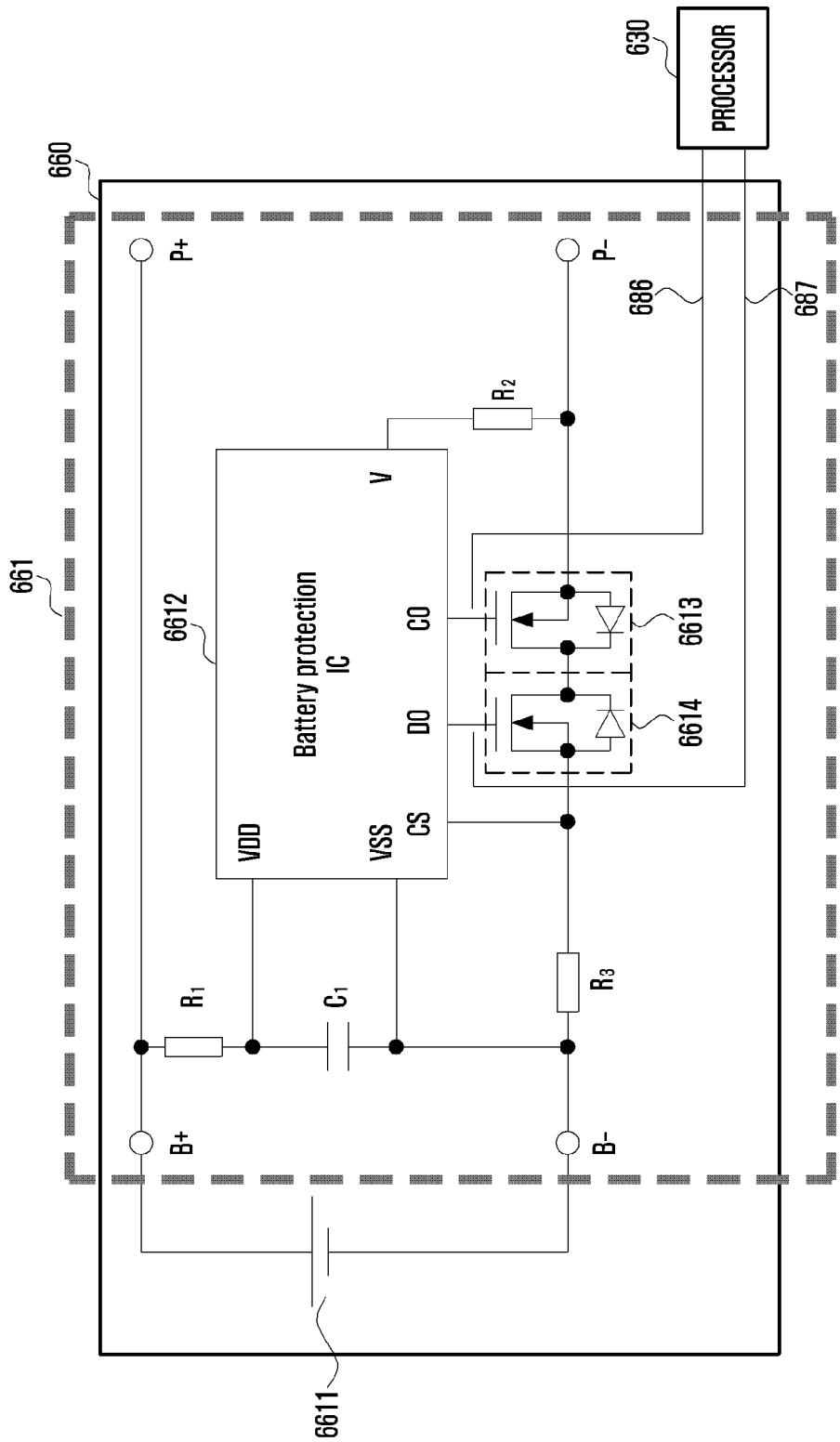
FIG. 6B is a view for illustrating a connection wire of a second battery and a processor according to an embodiment.

FIG. 6A illustrates a configuration of an electronic device according to various embodiments, and FIG. 6B is a view for illustrating a connection wire of a second battery and a processor according to an embodiment.

Referring to FIG. 6A, an electronic device (e.g., the electronic device 101 in FIG. 1, the electronic device 101 in FIG. 3, and the electronic device 101 in FIG. 4) according to an embodiment may be a foldable electronic device 101 as illustrated in FIG. 3 and FIG. 4. The electronic device 101 may include a first housing 610 and a second housing 620 which are rotatably coupled to each other.

According to an embodiment, the electronic device 101 may include a processor 630, a charging module 640, a first battery 650, a second battery 660, and a current limiter 670. In one example, the processor 630, the charging module 640, the current limiter 670, and the first battery 650 may be arranged in an inner space of the first housing 610. A second battery 660 may be arranged inside the second housing 620.

In the electronic device 101 according to an embodiment, at least one battery (e.g., the second battery 660 and the sub-battery) of the plurality of batteries, in which the current limiter is not arranged, may be electrically connected to the processor 630.

According to an embodiment, the first battery 650 and the second battery 660 may have the same or different battery types and/or capacities (or maximum capacities) and may have different specifications.

According to an embodiment, the charging module 640 may be electrically connected to the first battery 650 and the second battery 660, and may supply the designated voltage or current to the first battery 650 and/or the second battery 660 using the power supplied from an external power source (e.g., a power adapter, a USB charger, or wireless charging). For example, the charging module 640 may select a charging method (e.g., normal charging or rapid charging) based on at least a part of the attributes of the batteries 650 and 660, the magnitude of the power (e.g., about 20 watts or more) which can be supplied from the external power source, or the type of external power source, and may charge the first battery 650 and the second battery 660 using the selected charging method. For example, the external power source and the electronic device 101 may be connected by wire via a wired communication interface or may be wirelessly connected via a wireless charging circuit.

According to an embodiment, while the electronic device 101 is supplied with power from an external power source, the charging module 640 may use a part of the input power to charge the batteries 650 and 660, and may use another part of the input power to supply the power (e.g., voltage or current) to drive the processor 630 (or another component of the electronic device 101).

According to an embodiment, the charging module 640 may be electrically connected to the first battery 650 via a first wire 680, and may be electrically connected to the second battery 660 via a second wire 683 branched from a first node N1 of the first wire 680. The first battery 650 and the second battery 660 may be connected in parallel.

According to an embodiment, the first battery 650 may be charged by the voltage and current supplied from the charging module 640, and the second battery 660 may be charged by receiving the voltage and current from the charging module 640 via the FPCB 685.

According to an embodiment, at least a part of the second wire 683 may include the FPCB 685. Here, the FPCB 685 may mean an electrical wire crossing a hinge module (e.g., the rotation assemblies 330 and 340 in FIG. 3) which rotatably connects the first housing 610 and the second housing 620.

According to an embodiment, the first battery 650 may include a first protection circuit module (PCM) 651. The first PCM 651 may perform at least one of the overcharge protection function, the over-discharge protection function, the overcurrent blocking function, and the short-circuiting protection function of the first battery 650. The voltage/current specifications of the first PCM 651 may be determined in consideration of the specifications of the first battery 650.

According to an embodiment, the first PCM 651 may be configured to detect the voltage of the first battery 650 to determine whether the first battery 650 is in the overcharged state or the over-discharged state so as to prevent (or block) charging and discharging of the first battery 650. The first PCM 651 may control the opening and closing of a switching module (e.g., a charge control switching element/a first switch and discharge control switching element/a second switch) to prevent (or block) charging and/or discharging of the first battery 650.

According to an embodiment, the switching module may include a charge control switching element and a discharge control switching element (e.g., 6613 and 6614 in FIG. 6B). The charge control switching element and the discharge control switching element may be implemented by, for example, a metal oxide semiconductor field effect transistor (MOSFET) as an ON/OFF switch.

According to an embodiment, in a normal charge or discharge operation, the first PCM 651 may turn on the charge control switching element or the discharge control switching element, and, in an overcharging or over-discharging state, may turn off the charge control switching element or the discharge control switching element. For example, when the first battery 650 is charged at a level where the battery voltage reaches or exceeds the set maximum value (e.g., the detection voltage for overcharge prevention), the first PCM 651 may turn off the charge control switching element to stop the charging of power to the first battery 650 so as to prevent the overcharging. In another example, when the first battery 650 is over-discharged at a level where the battery voltage is at or below the set minimum value (e.g., the detection voltage for over-discharge prevention), the first PCM 651 may turn off the discharge control switching element to stop the discharge of power in the first battery 650.

According to an embodiment, when the release detection voltage (e.g., the overcharge release detection voltage) from which the overcharge is released is detected, the first PCM 651 may change the charge control switching element to the ON state. When the over-discharge release voltage (over-discharge release detection voltage) is detected, the first PCM 651 may change the discharge control switching element to the ON state.

According to an embodiment, the first PCM 651 may stop the charging and discharging of the first battery 650 without the involvement of the processor 630, but in another embodiment, the operation of the first PCM 651 may be performed under the instruction of the processor 630.

According to an embodiment, the current limiter 670 may be disposed between the first wires 680 connecting the first battery 650 and the charging module 640. The current limiter 670 may be electrically connected to the processor 630 and the first PCM 651. The current limiter 670 may limit (or block) the current to prevent damage to the battery (e.g., the first battery 650) or the protection circuit (e.g., the first PCM 651) due to overcurrent.

The current limiter 670 may monitor the voltage/current (i.e., the voltage, the current or both) supplied to the first battery 650, and may adjust or limit (or block), based on the control signal received from the processor 630, the magnitude of the current flowing into the first battery 650.

For example, the current limiter 670 may detect the voltage/current transferred to the first battery 650 (or the first PCM 651) and transfer the data corresponding to the detected current to the processor 630. When the current, at a level exceeding a predetermined standard, flows therein, based on the data received from the current limiter 670, the processor 630 may transfer a control signal which limits the magnitude of the current to the current limiter 670, and based on the control signal transferred from the processor 630, the current limiter 670 may adjust the magnitude of the current flowing into the first battery 650 (or the first PCM 651) so that the current with a smaller value is supplied to the first battery 650.

According to one embodiment, the current limiter 670 may be additionally implemented such that the current flowing into the first battery 650 is blocked.

According to one embodiment, the current limiter 670 may be implemented such that, when the current flows at a level of a limit level (e.g., under current) lower than a predetermined reference, the current flowing into the first battery 650 is blocked.

According to an embodiment, the second battery 660 may include a second protection circuit module (PCM) 661. The second PCM 661 may perform at least one of the overcharge protection function, the over-discharge protection function, the overcurrent blocking function, or the short-circuiting protection function of the second battery 660. Since the second PCM 661 performs the same functions as those of the first PCM 651, redundant contents will be omitted.

According to an embodiment, the second battery 660 (or the second PCM 661) may be electrically connected to the processor 630. In an example, the processor 630 may be connected to the charge control switching element (e.g., 6613 in FIG. 6B) included in the second PCM 661 by a third wire 686, and may be connected to the discharge control switching element (e.g., 6614 in FIG. 6B) by a fourth wire 687. The charge control switching element and the discharge control switching element may be implemented by, for example, a metal oxide semiconductor field effect transistor (MOSFET) as an ON/OFF switch.

According to an embodiment, without the intervention of a current limiter, the processor 630 may detect (or estimate) the value of the current flowing into the second battery 660 (or the second PCM 661) while charging the second battery 660, and control the current to prevent overcurrent of the second battery 660.

In an example, the processor 630 may estimate the value of the current flowing into the second battery 660. The processor 630 may measure the total current value (e.g., an $I_{total}$) at the output terminal of the charging module 640 in the wire path for charging the batteries 650 and 660. For example, a resistor (e.g., a series resistor) 690 may be disposed near the output terminal of the charging module 640. In an embodiment, the resistor 690 may be disposed between the charging module 640 and the first node N1, and electrically connected to the charging module 640. The resistor 690 may stabilize the fluctuation of a supply power source of the charging module 640 and may be used as a current-limiting resistance when a high voltage charger or a charger exceeding the maximum rating is connected in reverse. The processor 630 may recognize the current flowing through the resistor 690 to measure the total current value (e.g., the $I_{total}$).

The processor 630 may measure a first current value (e.g., an $I_1$) which passes through the current limiter 670 and flows into the first battery 650. The processor 630 may measure the power flowing between the current limiter 670 and the first battery 650 via a power meter (not illustrated) embedded in the current limiter 670, and convert the same into a current value to identify the first current value (e.g., the $I_1$).

The processor 630 may calculate the difference between the total current value (e.g., the $I_{total}$) and the first current value (e.g., the $I_1$) to estimate the same (i.e., the difference) as the second current value (e.g., the $I_2$) flowing through an input terminal of the second battery 660.

The processor 630 may determine whether the second current value (e.g., the 12) is out of the limit range of the second battery charging current (e.g., a maximum charging limit current and a minimum charging limit current), generate a control signal for blocking the current supplied to the second battery 660 when the determined second current value (e.g., the $I_2$) exceeds the current limit range, and change the charge control switching element (e.g., 6613 in FIG. 6B) included in the second PCM 661 to the OFF state via the third wire 686, so as to block the current flowing into the second battery 660.

According to an embodiment, the limit range of the charging current may be changed to be different depending on the magnitude of the battery charging voltage.

According to another embodiment, without the intervention of the current limiter, based on the total current value (e.g., the $I_{total}$) and the first current value (e.g., the $I_1$) measured in the discharge path while the second battery 660 is discharged, the processor 630 may calculate a second current value (e.g., the $I_2$) emitted from the second battery 660 (or the second PCM 661) to an external terminal, and determine whether the second current value (e.g., the $I_2$) is out of the limit range (e.g., over a maximum discharging limit current or below a minimum discharging limit current) of the second battery discharge current. The processor 630 may generate a control signal which blocks the current emitted from the second battery 660 when the second current value (e.g., the $I_2$) is out of an allowable range of the discharge current, and change the discharge control switching element (e.g., 6614 in FIG. 6B) included in the second PCM 661 to the OFF state via the fourth wire 687, so as to block the current output from the second battery 660 (or the second PCM 661).

Hereinafter, the internal connection wire between the second battery 660 and the processor 630 will be described. The battery and PCM illustrated in FIG. 6B may be the second battery 660 and the second PCM 661 in FIG. 6A.

According to an embodiment, the processor 630 may be connected to a charge control switching element 6613 of the second PCM 661 by the third wire 686, and may be connected to a discharge control switching element 6614 by the fourth wire 687.

The second PCM 661 may include internal terminals (B+, B−) for being connected to a battery cell 6611, and external terminals (P+ P−) for being connected to a charger during charging and connected to the components of the electronic device by the battery power source during discharging.

A protection IC 6612 may include a VDD terminal which is connected to the internal terminal (B+), which is the (+) terminal of the battery, via the resistor R1 and detects the voltage application and battery voltage to which the charge voltage or discharge voltage is applied, a VSS terminal which serves as a reference for the internal operating voltage, a detection terminal (e.g., a V terminal) for detecting charge/discharge and overcurrent states, an over-discharge blocking signal output terminal (e.g., a DO terminal) for turning off the discharge control switching element 6614 in the over-discharged state, and an overcharge blocking signal output terminal (e.g., a CO terminal) for turning off the charge control switching element 6613 in the overcharge state.

Although not illustrated, the protection IC 6612 may further include at least one of a reference voltage setting unit, a comparison unit for comparing the reference voltage and the charge/discharge voltage, an overcurrent detection unit, and a charge/discharge detection unit. Here, the protection IC 6612 may change the determination reference of the charge and discharge states according to the battery specifications (Specs), and recognize the voltage difference of each terminal according to the determination reference to determine the charge/discharge state.

When the protection IC 6612 reaches the over-discharged state during discharging, the DO terminal becomes low so that the discharge control switching element 6614 may be turned off, and when the protection IC 6612 reaches the overcharge state during charging, the CO terminal becomes low so that the charge control switching element 6613 may be turned off.

Independently of the operation of the protection IC 6612, the processor 630 may be configured to calculate the second current value (e.g., the $I_2$) of the second battery 660 to prevent the overcurrent flowing through the second battery 660, turn off the charge control switching element 6613 via the third wire 686 during charging based on the second current value (e.g., the $I_2$), and turn off the discharge control switching element 6614 via the fourth wire 687 during over-discharging.

An electronic device (e.g., the electronic device 101 in FIG. 1, the electronic device 101 in FIG. 3, the electronic device 101 in FIG. 4, and the electronic device 101 in FIG. 6A) according to various embodiments may include a first battery (e.g., the battery 189 in FIG. 1, the first battery 650 in FIG. 6A) including a first protection circuit module (first PCM) (e.g., the first PCM 651 in FIG. 6A), a second battery (e.g., the battery 189 in FIG. 1 and the second battery 660 in FIG. 6A) which is branched from a first node (e.g., the N1 in FIG. 6A) to be connected to the first battery 650 in parallel and includes a second protection circuit module (second PCM) (e.g., the second PCM 661 in FIG. 6A), a charging module (e.g., the charging module 640 in FIG. 6A) which is connected to the first node and uses the power input from an external device to charge the first battery 650 and the second battery 660, a current limiter (e.g., the current limiter 670 in FIG. 6A) which is disposed between the first node and the first battery 650 and adjusts the magnitude of the current flowing into the first battery 650, and a processor (e.g., the processor 120 in FIG. 1 and the processor 630 in FIG. 6A) electrically connected to the current limiter 670 and the second battery 660, where the processor 120 or 630 is configured to measure a value of a total current ($I_{total}$) output from the charging module 640 and a value of the first current ($I_1$) output from the current limiter to the first battery 650, calculate the difference between the value of the total current ($I_{total}$) and the value of the first current ($I_1$) to estimate a value of a second current ($I_2$) transferred to the second battery 660, and control, based on the value of the second current, the opening/closing of the switching module included in the second PCM 661 to control the second current of the second battery 660.

The switching module according to various embodiments may include a first switch (e.g., the charge control switching element 6613 in FIG. 6B) positioned in a charge path of the second battery 660 to prevent overcharging, and a second switch (e.g., the discharge control switching element 6614 in FIG. 6B) positioned in a discharge path of the second battery 660 to prevent over-discharging.

The processor 120 or 630 according to various embodiments may be configured to measure the value of the total current via a resistor positioned near an output terminal of the charging module 640.

The processor 120 or 630 according to various embodiments may be configured to measure the power between the current limiter 670 and the first battery 650 via a power meter included in the current limiter 670, and convert the measured power into a current value to measure the value of the first current.

The processor 120 or 630 according to various embodiments may be connected to the first switch (e.g., the charge control switching element 6613 in FIG. 6B) by a first wire (e.g., the third wire 686 in FIG. 6B), and connected to the second switch (e.g., the discharge control switching element 6614 in FIG. 6B) by a second wire (e.g., the fourth wire 687 in FIG. 6B).

The processor 120 or 630 according to various embodiments may be configured to, when the first battery 650 and the second battery 660 are charged, monitor whether the value of the second current is within a limit range of a charging current, and turn off the first switch (e.g., the charge control switching element 6613 in FIG. 6B) via the first wire when the value of the second current is out of the limit range of the charging current.

The processor 120 or 630 according to various embodiments may be configured to, when the first battery 650 and the second battery 660 are discharged, monitor whether a value of a third current discharged from the second battery 660 is within a limit range of a discharge current, and turn off the second switch (e.g., the discharge control switching element 6614 in FIG. 6B) via the second wire when the value of the third current is out of the limit range of the discharge current.

The electronic device 101 according to various embodiments may further include a first housing (e.g., the first housing 320 in FIG. 3, the first housing 410 in FIG. 4, and the first housing 610 in FIG. 6A) and a second housing (e.g., the second housing 310 in FIG. 3, the second housing 420 in FIG. 4, and the second housing 620 in FIG. 6A) which are rotatably coupled to each other via a hinge module (e.g., the rotation assembly 330 in FIG. 3), where the charging module 640, the current limiter 670, and the first battery 650 may be disposed in the first housing 610, and the second battery 660 may be disposed in the second housing 620.

The second battery 660 according to various embodiments may be connected to the charging module 640 disposed in the first housing 610 by a flexible printed circuit board (FPCB) disposed across the first hinge module.

The second battery 660 according to various embodiments may be connected to the charging module 640 via a flexible printed circuit board (FPCB), and the first battery 650 may be connected to the charging module 640 without passing through the FPCB.

Figure 7:
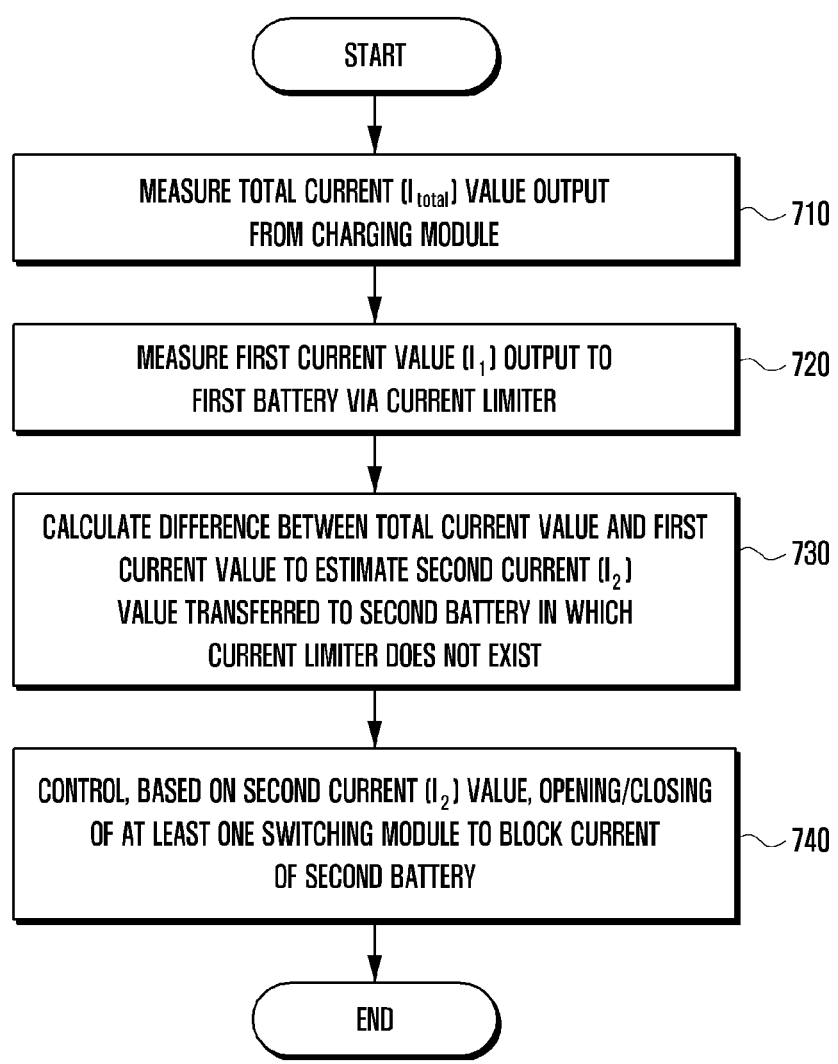
FIG. 7 illustrates an overcurrent protection operation of a battery of an electronic device according to an embodiment.

FIG. 7 illustrates an overcurrent protection operation of a battery of an electronic device according to an embodiment.

Referring to FIG. 7, according to an embodiment, a processor (e.g., the processor 120 in FIG. 1 and the processor 630 in FIG. 6A/6B) of an electronic device including a plurality of batteries may measure a total current value (e.g., the $I_{total}$) flowing through an output terminal of a charging module (e.g., the charging module 640 in FIG. 6A) in operation 710. For example, the processor 630 may detect the current flowing through a resistor (e.g., series resistance 690) disposed near the output terminal of the charging module 640 so as to measure a total current value (e.g., the $I_{total}$).

In operation 720, the processor 630 may measure a first current value (e.g., the $I_1$) flowing into a first battery (e.g., the first battery 650 in FIG. 6A) in which a current limiter (e.g., the current limiter 670 in FIG. 6A) is disposed. For example, the processor 630 may measure the power flowing between the current limiter 670 and the first battery 650 via a power meter (not illustrated) embedded in the current limiter 670, and convert the same (i.e., the power) into a current value to identify the first current value (e.g., the $I_1$).

In operation 730, the processor 630 may calculate the difference between the total current value (e.g., the $I_{total}$) and the first current value (e.g., the $I_1$) to estimate the second current value (e.g., the $I_2$) flowing through an input terminal of the second battery (e.g., the second battery 660 in FIG. 6A) in which the current limiter is not disposed.

In operation 740, the processor 630 may control, based on the second current value (e.g., the $I_2$), the opening/closing of at least one switching module (e.g., the charge control switching element or the first switch 6613 and the discharge control switching element or the second switch 6614 in FIG. 6B) included in a second protection circuit module (e.g., the second PCM 661 in FIG. 6A/6B) so as to block the overcurrent from flowing into the second battery 660.

In an example, the processor 630 may determine whether the second current value (e.g., the $I_2$) is out of the limit range (e.g., range from current-minimum charging limit current to maximum charging limit) of the charging current, generate a control signal which blocks the current supplied to the second battery 660 when the second current value (e.g., the $I_2$) is out of the limit range of the charging current, and turn off the charge control switching element or the first switch (e.g., the charge control switching element 6613 in FIG. 6B) included in the second PCM 661 via the first wire (e.g., the third wire 686 in FIG. 6B), so as to block the charging current flowing into the second battery 660.

In an example, the processor 630 may determine whether the second current value (e.g., the $I_2$) is out of the limit range (e.g., range from current-minimum charging limit current to maximum discharging limit current) of the discharging current, generate a control signal to block the current output from the second battery 660 when the second current value (e.g., the $I_2$) is out of the limit range of the discharging current, and turn off the discharge control switching element or the second switch (e.g., the discharge control switching element 6614 in FIG. 6B) included in the second PCM 661 via the second wire (e.g., the fourth wire 687 in FIG. 6B), so as to block the discharging current of the second battery 660.

Figure 8:
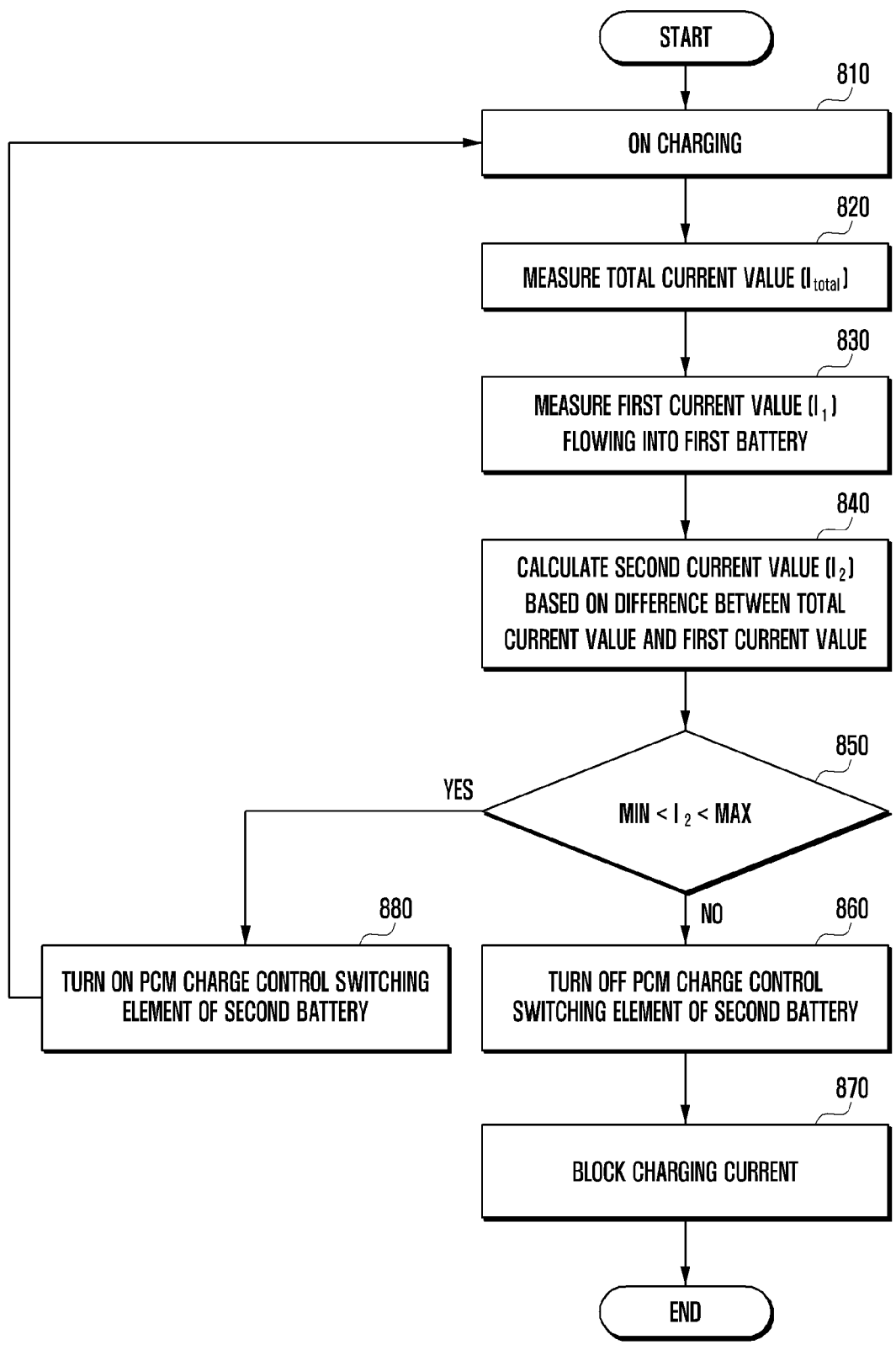
FIG. 8 illustrates a battery protection operation of an electronic device according to an embodiment.

FIG. 8 illustrates a battery protection operation of an electronic device according to an embodiment.

Referring to FIG. 8, in operation 810, an electronic device 101 according to an embodiment may be supplied with power from an external power source (e.g., a power adapter, a USB charger, wireless charging) to charge a plurality of batteries (e.g., the batteries 650 and 660 in FIG. 6A) via a charging module (e.g., the charging module 640 in FIG. 6A).

For example, a processor (e.g., the processor 630 in FIG. 6A/6B) of the electronic device 101 may use a voltage value loaded on opposite ends of a sensing resistor (e.g., the resistor 690 in FIG. 6A) positioned between the batteries 650 and 660 and the charging module 640 to identify whether the batteries 650 and 660 have been charged or discharged.

In operation 820, the processor 630 may measure a total current value (e.g., the $I_{total}$) flowing through the output terminal of the charging module 640. For example, the processor 630 may detect the current flowing through a resistor (e.g., a series resistor) 690 disposed near the output terminal of the charging module 640 so as to measure the total current value (e.g., the $I_{total}$).

In operation 830, the processor 630 may measure the first current value (e.g., the $I_1$) flowing into the first battery (e.g., the first battery 650 in FIG. 6A) in which the current limiter (e.g., the current limiter 670 in FIG. 6A) is disposed. For example, the processor 630 may measure the power flowing between the current limiter 670 and the first battery 650 via a power meter (not illustrated) embedded in the current limiter 670, and convert the same (i.e., the power) into a current value to identify the first current value (e.g., the $I_1$).

In operation 840, the processor 630 may calculate the difference between the total current value (e.g., the $I_{total}$) and the first current value (e.g., the $I_1$) to estimate the second current value (e.g., the $I_2$) flowing through the input terminal of the second battery (e.g., the second battery 660 in FIG. 6A) in which the current limiter is not disposed.

In operation 850, the processor 630 may monitor whether the second current value (e.g., the $I_2$) exists between the maximum charging limit current value (MAX) and the minimum charging limit current value (MIN), which is the limit range allowed during charging.

According to an embodiment, the processor 630 may operate such that the maximum charging limit current value and the minimum charging limit current value are variable according to the charging state of the second battery 660.

In an example, the electronic device 101 may charge the batteries 650 and 660 with a constant current when the output voltage of the batteries 650 and 660 is lower than the designated target voltage value during charging, and may charge the batteries 650 and 660 with a constant voltage when the output voltage of the batteries 650 and 660 reaches the target voltage value. The processor 630 may set the maximum charging limit current value and the minimum charging limit current value of the second battery 660 to vary, depending on the output voltage or charging mode of the second battery 660, and this may vary depending on the specifications of the second battery 660.

In operations 860 and 870, when the second current value (e.g., the $I_2$) is less than the minimum charging limit current (MIN) or exceeds the maximum charging limit current (MAX), the processor 630 may turn off the charge control switching element or the first switch (e.g., the charge control switching element 6613 in FIG. 6B) of the PCM (e.g., the second PCM 661) of the second battery 660 to block the charging current flowing into the second battery 660. When the second current value (e.g., the $I_2$) is less than the minimum charging limit current (MIN) or exceeds the maximum charging limit current (MAX), the processor 630 may generate a control signal which blocks the current supplied to the second battery 660, and transfer the control signal to the second PCM 661 via the first wire (e.g., the third wire 686 in FIG. 6B).

In operation 880, when the second current value (e.g., the $I_2$) is between the maximum charging limit current value (MAX) and the minimum charging limit current value (MIN), which is in the limit range allowed during charging, the processor 630 may turn on the charge control switching element (e.g., 6613 in FIG. 6B) of the second battery PCM (e.g., the second PCM) to return to 810 operation so as to continue charging the second battery.

Figure 9:
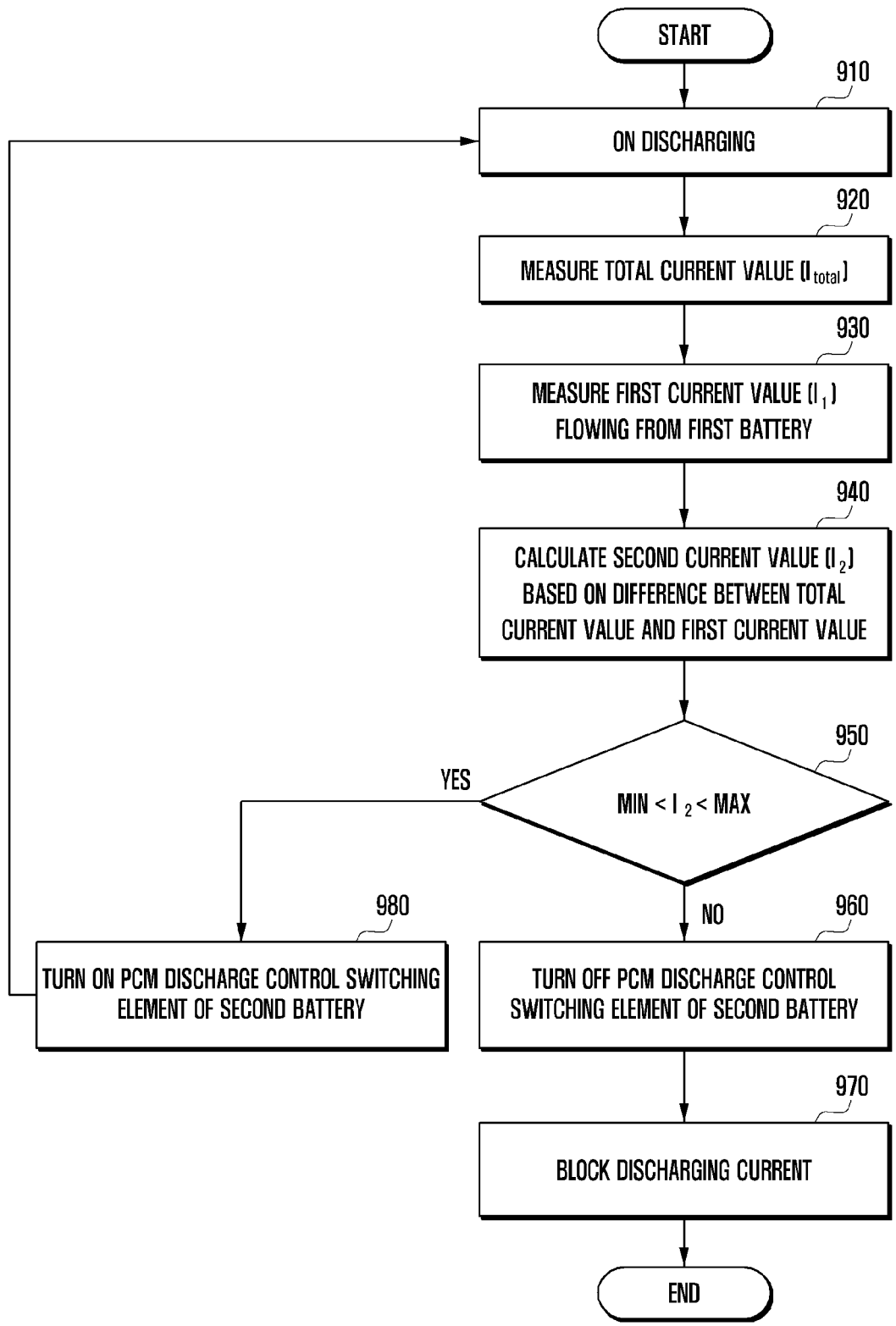
FIG. 9 illustrates a battery protection operation of an electronic device according to an embodiment.

FIG. 9 illustrates a battery protection operation of an electronic device according to an embodiment.

Referring to FIG. 9, in operation 910, in an electronic device 101 according to an embodiment, a plurality of batteries 650 and 660 may be discharging. For example, the discharged state may be a state in which the electronic device 101 is not connected to an external power source, and a state in which power is output to an external terminal of the batteries 650 and 660. The processor (e.g., the processor 630 in FIG. 6A/6B) may use a voltage value loaded on opposite ends of a sensing resistor (e.g., the resistor 690 in FIG. 6A) positioned between the batteries 650 and 660 and a charging module (e.g., the charging module 640 in FIG. 6A) to identify whether the batteries 650 and 660 have been charged or discharged.

In operation 920, the processor 630 may measure a total current value (e.g., the $I_{total}$) flowing through the output terminal of the charging module 640. For example, the processor 630 may detect the current flowing through a resistor (e.g., a series resistor) 690 disposed near the output terminal of the charging module 640 so as to measure the total current value (e.g., the $I_{total}$).

In operation 930, the processor 630 may measure the first current value (e.g., the $I_1$) discharged from the first battery (e.g., the first battery 650 in FIG. 6A) in which the current limiter (e.g., the first battery 650 in FIG. 6A) is disposed. For example, the processor 630 may measure the power flowing between the current limiter 670 and the first battery 650 via a power meter (not illustrated) embedded in the current limiter 670, and convert the same (i.e., the power) into a current value to identify the first current value (e.g., the $I_1$).

In operation 940, the processor 630 may calculate the difference between the total current value (e.g., the $I_{total}$) and the first current value (e.g., the $I_1$) to estimate the second current value (e.g., the $I_2$) discharged from the second battery (e.g., the second battery 660 in FIG. 6A) in which the current limiter is not disposed.

In operation 950, the processor 630 may monitor whether the second current value (e.g., the $I_2$) exists between the maximum discharging limit current value (MIN) and the minimum discharging limit current value (MAX), which is in the limit range allowed during discharging.

According to an embodiment, the processor 630 may identify the maximum discharging limit current value (MAX) and the minimum discharging limit current (MIN) of the second battery 660, and this may vary depending on the specifications of the second battery 660.

In operations 960 and 970, when the second current value (e.g., the $I_2$) is less than the minimum discharging limit current (MIN) or exceeds the maximum discharging limit current (MAX), the processor 630 may turn off the discharge control switching element or the second switch (e.g., the discharge control switching element 6614 in FIG. 6B) of the second battery PCM (e.g., the second PCM 661) to block the discharging current of the second battery 660. When the second current value (e.g., the $I_2$) is less than the minimum discharging limit current (MIN) or exceeds the maximum discharging limit current (MAX), the processor 630 may generate a control signal for blocking the second discharging current to the second battery 660, and transfer the control signal to the second PCM 661 via the second wire (e.g., the fourth wire 687).

In operation 980, when the second current value (e.g., the $I_2$) is between the maximum discharging limit current value (MAX) and the minimum discharging limit current value (MIN), which is in the limit range allowed during charging, the processor 630 may turn on the discharge control switching element (e.g., 6614 in FIG. 6B) of the second battery PCM (e.g., the second PCM) to return to 810 operation so as to continue a discharging state of the second battery.

A battery protection method for an electronic device (e.g., the electronic device 101 in FIG. 1, the electronic device 101 in FIG. 3, the electronic device 101 in FIG. 4, or the electronic device 101 in FIG. 6A) including a plurality of batteries according to various embodiments may include the operations of measuring (e.g., 710 in FIG. 7) a total current ($I_{total}$) value output from a charging module (e.g., the charging module 640 in FIG. 6A) while a plurality of batteries are charged via the charging module, detecting (e.g., 720 in FIG. 7) the first current ($I_1$) value output to a first battery (e.g., the battery 189 in FIG. 1 and the first battery 650 in FIG. 6A) via a current limiter (e.g., the current limiter 670 in FIG. 6A), calculating (e.g., 730 in FIG. 7) the difference between the total current ($I_{total}$) value and the first current ($I_1$) value to estimate the second current ($I_2$) value transferred to the second battery without passing through a current limiter 670, where the first battery and the second battery are included in the plurality of batteries, and controlling (e.g., 740 in FIG. 7) the opening/closing of a switching module included in the protection circuit module (PCM) and included in the second battery (e.g., the battery 189 in FIG. 1 and the second battery 660 in FIG. 6A) based on the estimated second current value to control the current of the second battery 660, which has the second current ($I_2$) value.

According to various embodiments, in the operation of controlling the current of the second battery 660, at least one switch included in the switching module is turned off so that the current of the second battery 660 is blocked.

According to various embodiments, the second battery 660 may be connected to the charging module 640 via a flexible printed circuit board (FPCB), and the first battery 650 may be connected to the charging module 640 without passing through the FPCB.

According to various embodiments, in the operation of measuring the total current ($I_{total}$) value, the total current value is detected via a resistor positioned near an output terminal of the charging module 640.

According to various embodiments, in the operation of detecting the first current ($I_1$) value, the power between the current limiter 670 and the first battery 650 is measured via a power meter included in the current limiter 670, and the measured power is converted into a current value to measure the first current value.

According to various embodiments, the switching module may include a first switch (e.g., the charge control switching element 6613 in FIG. 6B) positioned in a charge path of the second battery 660 to prevent overcharging, and a second switch (e.g., the discharge control switching element 6614 in FIG. 6B) positioned in a discharge path of the second battery 660 to prevent over-discharging.

According to various embodiments, the first switch is connected to a processor (e.g., the processor 120 in FIG. 1 and the processor 630 in FIG. 6A) of the electronic device by a first wire, and the second switch is connected to the processor by a second wire.

According to various embodiments, in the operation of controlling the opening/closing of the switching module to control the current of the second battery 660, when the first battery 650 and the second battery 660 are charged, it is monitored whether the second current value is within the limit range of the charging current, and when the second current value is out of the limit range of the charging current, the first switch (e.g., the charge control switching element 6613 in FIG. 6B) is controlled to be turned off via the first wire.

According to various embodiments, in the operation of controlling the opening/closing of the switching module to control the current of the second battery 660, when the first battery and the second battery are discharged, it is monitored whether a third current value discharged from the second battery is within the limit range of the discharging current, and when the third current value is out of the limit range of the discharging current, the second switch (e.g., the discharge control switching element 6614 in FIG. 6B) is controlled to be turned off via the second wire.

According to various embodiments, the electronic device 101 may further include a first housing (e.g., the first housing 320 in FIG. 3, the first housing 410 in FIG. 4, and the first housing 410 in FIG. 6A) and a second housing (e.g., the second housing 310 in FIG. 3, the second housing 420 in FIG. 4, and the second housing 620 in FIG. 6A) which are rotatably coupled to each other via a hinge module (e.g., the rotation assembly 330 in FIG. 3), wherein the charging module 640, the current limiter 670, and the first battery 650 are disposed in the first housing 610, and the second battery 660 may be disposed in the second housing 620.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." "A/B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

What is claimed is:

1. An electronic device comprising:
   a first battery including a first protection circuit module;
   a second battery, which is branched from a node to be connected to the first battery in parallel and includes a second protection circuit module PCM;
   a charging module, which is connected to the node and uses power input from an external device to charge the first battery and the second battery;
   a current limiter, which is disposed between the node and the first battery and adjusts a magnitude of a first current flowing into the first battery; and
   a processor electrically connected to the current limiter and the second battery,
   wherein the processor is configured to measure a value of a total current ($I_{total}$) output from the charging module and a value of the first current ($I_1$) output from the current limiter to the first battery,
   calculate a difference between the value of the total current ($I_{total}$) and the value of the first current ($I_1$) to estimate a value of a second current ($I_2$) transferred to the second battery, and
   control, based on the value of the estimated second current ($I_2$), opening/closing of a switching module included in the second protection circuit module to control the second current ($I_2$) of the second battery.

2. The electronic device of claim 1, wherein the switching module comprises a first switch positioned in a charge path of the second battery to prevent overcharging, and a second switch positioned in a discharge path of the second battery to prevent over-discharging.

3. The electronic device of claim 2, wherein the processor is configured to measure the value of the total current ($I_{total}$) via a resistor positioned between the node and an output terminal of the charging module.

4. The electronic device of claim 2, wherein the processor is configured to measure a power between the current limiter and the first battery via a power meter included in the current limiter, and convert the measured power into a current value to measure the value of the first current ($I_1$).

5. The electronic device of claim 2, wherein the processor is connected to the first switch by a first wire, and connected to the second switch by a second wire.

6. The electronic device of claim 5, wherein the processor is configured to, when the first battery and the second battery are charged, monitor whether the value of the second current is within a limit range of a charging current, and turn off the first switch via the first wire in case that the value of the second current is out of the limit range of the charging current.

7. The electronic device of claim 5, wherein the processor is configured to, when the first battery and the second battery are discharged, monitor whether a value of a third current discharged from the second battery is within a limit range of a discharge current, and turn off the second switch via the second wire in case that the value of the third current is out of the limit range of the discharge current.

8. The electronic device of claim 5, further comprising a first housing and a second housing rotatably coupled to each other via a hinge module,
   wherein the charging module, the current limiter, and the first battery are disposed in the first housing, and the second battery is disposed in the second housing.

9. The electronic device of claim 8, wherein the second battery is connected to the charging module disposed in the first housing by a flexible printed circuit board disposed across the hinge module.

10. The electronic device of claim 1, wherein the second battery is connected to the charging module via a flexible printed circuit board, and
    wherein the first battery is connected to the charging module without passing through the flexible printed circuit board.

11. A method for protecting a battery of an electronic device including a plurality of batteries, the method comprising:

measuring a total current ($I_{total}$) value output from a charging module while the plurality of batteries are charged via the charging module;

detecting a first current ($I_1$) value output to a first battery via a current limiter;

calculating a difference between the total current ($I_{total}$) value and the first current ($I_1$) value to estimate a second current ($I_2$) value transferred to a second battery without passing through any current limiter, wherein the first battery and the second battery are included in the plurality of batteries; and controlling, based on the estimated second current ($I_2$) value, a current ($I_2$) of the second battery, which has the second current ($I_2$) value, by controlling opening/closing of a switching module included in a protection circuit module of the second battery.

12. The method of claim 11, wherein the controlling of the current ($I_2$) of the second battery comprises turning off at least one switch included in the switching module so as to interrupt the current ($I_2$) of the second battery.

13. The method of claim 11, wherein the second battery is connected to the charging module via a flexible printed circuit board, and wherein the first battery is connected to the charging module without passing through the flexible printed circuit board.

14. The method of claim 11, wherein the measuring of the total current ($I_{total}$) value comprises detecting the total current ($I_{total}$) value via a resistor positioned near an output terminal of the charging module.

15. The method of claim 11, wherein the detecting of the first current ($I_1$) value comprises:

measuring a power between the current limiter and the first battery via a power meter included in the current limiter, and converting the measured power into a current value to measure the first current ($I_1$) value.

16. The method of claim 11, wherein the switching module includes a first switch positioned in a charge path of the second battery to prevent overcharging, and a second switch positioned in a discharge path of the second battery to prevent over-discharging.

17. The method of claim 16, wherein the first switch is connected to a processor of the electronic device by a first wire, and the second switch is connected to the processor by a second wire.

18. The method of claim 16, wherein the controlling of the opening/closing of the switching module comprises:

when the first battery and the second battery are charged, monitoring whether the second current ($I_2$) value is within a limit range of a charging current; and in case that the second current ($I_2$) value is out of the limit range of the charging current, controlling the first switch to be turned off via the first wire.

19. The method of claim 16, wherein the controlling of the opening/closing of the switching module comprises:

when the first battery and the second battery are discharged, monitoring whether a third current value discharged from the second battery is within a limit range of a discharging current; and in case that the third current value is out of the limit range of the discharging current, controlling the second switch to be turned off.

20. The method of claim 11, wherein the electronic device further comprises a first housing and a second housing rotatably coupled to each other via a hinge module, and wherein the charging module, the current limiter, and the first battery are disposed in the first housing and the second battery is disposed in the second housing.

* * * * *